United States Patent
Coppoolse

(10) Patent No.: US 7,188,831 B2
(45) Date of Patent: Mar. 13, 2007

(54) FLEXURE-TYPE SUSPENSION SYSTEM PROVIDING FOR THREE DEGREES OF FREEDOM AND FLEXURE-TYPE POSITIONING ASSEMBLY BASED THEREON

(76) Inventor: Willem Walter Coppoolse, Stationsstrasse 49, CH-8425 Zürich (CH)

( * ) Notice: Subject to any disclaimer, the term of this patent is extended or adjusted under 35 U.S.C. 154(b) by 0 days.

(21) Appl. No.: 10/712,717

(22) Filed: Nov. 13, 2003

(65) Prior Publication Data
US 2004/0094882 A1    May 20, 2004

(30) Foreign Application Priority Data
Nov. 13, 2002  (EP) .................................. 02025310

(51) Int. Cl.
*F16F 1/18*  (2006.01)
(52) U.S. Cl. ........................ 267/160; 267/158
(58) Field of Classification Search ........ 267/158–160; 248/603–629; 359/223, 224
See application file for complete search history.

(56) References Cited
U.S. PATENT DOCUMENTS

| | | | |
|---|---|---|---|
| 3,246,890 A * | 4/1966 | Ormond | ............ 267/138 |
| 3,946,166 A | 3/1976 | Wossidlo | |
| 4,073,567 A | 2/1978 | Lakerveld et al. | |
| 4,917,484 A | 4/1990 | Heinz | |
| 4,973,145 A | 11/1990 | Kirkwood et al. | |
| 5,110,195 A | 5/1992 | Loney | |
| 5,178,357 A * | 1/1993 | Platus | ............ 248/619 |
| 5,267,720 A * | 12/1993 | Brazell et al. | ............ 248/638 |
| 5,268,784 A * | 12/1993 | Chaya | ............ 359/214 |
| 5,305,981 A * | 4/1994 | Cunningham et al. | ............ 248/550 |
| 5,353,167 A * | 10/1994 | Kuklo et al. | ............ 359/876 |
| 5,529,277 A | 6/1996 | Ostaszewski | |

FOREIGN PATENT DOCUMENTS

| | | |
|---|---|---|
| EP | 0 665 389 | 2/1995 |
| FR | 25 57 313 | 6/1985 |

* cited by examiner

*Primary Examiner*—Christopher P. Schwartz

(57) ABSTRACT

Suspension system comprising a flat spring member having four legs. The legs are symmetrically arranged with respect to the center position of the spring member and each of the legs has a longitudinal axis and an end portion. A suspension frame is provided to support the spring member (by fixing the end portion of two legs. Two preload elements are arranged close to the end portions of two of the legs in a manner to apply a preloading force at those legs. The preloading force essentially points in the direction of the longitudinal axis.

5 Claims, 8 Drawing Sheets

FLEXURE-TYPE SUSPENSION SYSTEM PROVIDING FOR THREE DEGREES OF FREEDOM AND FLEXURE-TYPE POSITIONING ASSEMBLY BASED THEREON

CROSS REFERENCE TO PRIOR APPLICATION

Applicant hereby claims foreign priority under 35 U.S.C. § 119 from European Patent Application No. 02025310.0 filed 13 Nov. 2003, the disclosure of which is herein incorporated by reference.

BACKGROUND OF THE INVENTION

1. Field of the Invention

The present invention concerns flexure-type suspension systems, flexure-type positioning assemblies based thereon and flexure-type fine positioning assemblies for the positioning of optical elements. Precision tip-tilt piston actuators providing exact constraint are addressed in particular.

A suspension system has to comply with a number of requirements, depending on the field of use. Typically, a suspension system serves as a mechanical interface between two points A and B, whereby the point B can move or can be moved with respect to the point A. A suspension typically restricts some of the degrees of freedom. A suspension may have a (linear) stiffness in $R_x$, $R_y$ and $T_z$ directions, for instance.

Suspension systems for suspending optical elements are for example employed to protect a movable mirror or lens against vibrations and to allow the mirror or lens to be tilted.

There are positioning assemblies that comprise a suspension system. In particular for positioning assemblies it is preferable to guarantee a linear stiffness.

Fine positioning assemblies are usually employed in order to provide for an accurate alignment of two remote systems. Fine positioning assemblies are for example used in optical systems where a laser transmitter (source) is to be aligned with respect to a receiver (target). Dynamic fine positioning assemblies are of particular importance, since many optical systems require a continuous adjustment between the source and the target. In the past, dynamic fine positioning assemblies were mainly used in a research environment since they were bulky and expensive. With the improvement of the positioning assemblies and with the reduction of their manufacturing cost, they are now more widely used in communication systems and measurement systems, for instance.

2. Related Prior Art

A known suspension system with a membrane suspension is schematically depicted in FIG. 1A. A membrane 1 is employed to suspend a mirror 4. The membrane 1 is preferably parallel to the mirror surface. The membrane can be made to have cut outs. Usually, the stiffness in $T_z$ and strength in $T_x$ and $T_y$ is compromised for compliance in $R_x$ and $R_y$. An example of a membrane-type fine positioning assembly similar to the one depicted in FIG. 1A is described in the paper "A Fine Pointing Mechanism For Intersatellite Laser Communication", P. Bandera, Proceedings of the $8^{th}$ European Space Mechanisms and Tribology Symposium, Toulouse, France, 29 Sep.—1 Oct. 1999, ESA SP-438. The assembly comprises a BeCu diaphragm (membrane) serving as suspension for a mirror. The periphery of the diaphragm is fixed by means of screws to a mirror assembly. It is a disadvantage of this design that it is critical to strain (e.g., thermal strain). Under certain circumstances, the diaphragm shows a non-linear behavior and cannot be made to retain its position and stiffness characteristics. It is a further disadvantage that the stiffness coefficients $T_z$, $R_x$, and $R_y$ change over the working range. There are also problems with the mechanical integrity of the suspension system reported. Mild mechanical shocks can lead to large unpredictable changes in mechanical behavior.

In FIG. 1B a known approach is illustrated. This approach is based on the approach depicted in FIG. 1A. In addition to the membrane 1 a post 2 is provided underneath the membrane 1. The post 2 gives vertical stiffness in $T_z$. The post 2 unfortunately adds to the stiffness in $R_x$ and $R_y$ for the same strength in $T_x$ and $T_y$. An example of a fine positioning assembly in accordance with FIG. 1B is described in the patent U.S. Pat. No. 5,110,195 assigned to the Massachusetts Institute of Technology (MIT). The assembly comprises a flexure ring with spokes serving as suspension for a mirror. In other words, a membrane with cut outs is employed. This design shows about the same disadvantages as the design by P. Bandera described above.

A suspension system with wire suspension is shown in FIG. 1C. An example of suspension system with wire suspension is described and claimed in the patent U.S. Pat. No. 4,973,145 assigned to Lockheed Missiles & Space Company. The assembly comprises a plurality of flexible support elements 3 (e.g., wires) being at their lower end connected to a foundation plate and at their upper end via a ring-shaped element—referred to as mounting plate—to a mirror 4. This design is complex and the assembling of this assembly is assumed to be cumbersome since the joining of the wires to the mirror 4 is difficult.

A cardanic flexure suspension is depicted in FIG. 1D. The flexure system consists of two perpendicular four-bar linkages 5.3, 5.4 coupled to a common plate 5.1. The upper ends of the linkages 5.3 are attached to ground and the upper end of the linkages 5.4 are fixed to a mirror frame 5.2 carrying the mirror 4. One example of a cardanic flexure-type fine positioning assembly having only two degrees of rotational freedom is described in the patent U.S. Pat. No. 5,529,277. This patent is assigned to Ball Aerospace, USA. There are various papers that address the Ball Aerospace flexure suspension and similar designs. This fine positioning assembly uses two perpendicular four-bar linkages coupled by a common part to provide a suspension for an object to be supported. It is a disadvantage of this assembly that the inertia of the interface can not be made uniform in all tip tilt directions. Comparable approaches are addressed in the German patent DE-19700580 and in the European Patent EP-0 665 389 currently assigned to Carl Zeiss, Germany.

Another type of suspension is called cardanic element suspension. It comprises a monolithic central hinge flexure. These kind of systems tend to have a low life expectancy when being exposed to high loads e.g., during the launch phase of a rocket.

Universal pivot suspensions are depicted in FIGS. 1E and 1F. Both suspension system comprise a post 7 suspending the mirror 4 in a single point provided inside a cone shaped support element 8. According to FIG. 1E, the mirror 4 is pulled onto the post 7 by means of two or more springs 6. Likewise, permanent magnets 9.1 and 9.2, as illustrated in FIG. 1F, can be used to pull the mirror 4 towards the post 7. The dynamic and static friction is small. Typically a diamond/diamond combination is used for the post 7 and cone 8. There are a number of patents that seek to apply this approach. A non-exhaustive listing is: U.S. Pat. No. 3,946,166, U.S. Pat. No. 4,100,576, U.S. Pat. No. 4,175,832, U.S. Pat. No. 4,073,467, and U.S. Pat. No. 4,157,861.

In addition to those approaches that are specifically mentioned, there are many other approaches known that typically are combinations or modifications of the six different approaches given in FIGS. 1A through 1F.

Conventional fine positioning assemblies which use membranes or membrane-like members are known to show a so-called "clicking effect", where the membrane from time to time jumps from one position to another position. This non-linear effect is a great disadvantage of known assemblies since it may lead to situations where the position of the membrane and thus the position of an optical element carried by the membrane is not defined anymore. Due to this non-linear behavior, the movements of the fine positioning assembly are not fully predictable.

SUMMARY OF THE INVENTION

It is an object of the present invention to provide a suspension system and to provide a positioning assembly that avoids the "clicking effect". It is an object of the present invention to provide a suspension system and to provide a positioning assembly that has a linear and reproducible deflection characteristic.

According to the present invention, a suspension system and a positioning respectively alignment assembly are provided that comprise a flat spring member. A suspension frame is provided to support the spring member. The spring member is fixed with respect to the suspension frame at m positions (with $m \geq 1$). The suspension system further comprises k (with $k \geq 1$) preload elements being arranged with respect to the spring member so as to apply a preloading force (F) to the spring member providing for a positive stress in the active part of the spring member. These k preload elements apply the preloading forces at positions that are spaced apart from the m positions where the spring member is fixed with respect to the suspension frame. The flat spring member is fixed to or with respect to the suspension frame at m+k>3 positions.

These and other objects are accomplished by a suspension system having a flat spring member, a suspension frame supporting the spring member by fixing the spring member at m positions with respect to the suspension frame, with m=1, k preload elements, with k=1, being arranged with respect to the suspension frame and the spring member in order to provide for positive stress in an active area of the spring member, and whereby m+k=3.

These and other objects are further accomplished by a positioning respectively alignment assembly comprising a suspension system as disclosed just above.

These and other objects are further accomplished by an optical system comprising a suspension system essentially as disclosed above or a positioning respectively alignment assembly as disclosed above and an optical element being suspended by the spring member.

These and other objects are further accomplished by a satellite comprising a suspension system essentially as disclosed above, or a psositioning respectively alignment assembly essentially as disclosed above, or an optical system essentially as disclosed above, whereby stops are being provided which provide for a protection during launch of the satellite.

Further advantageous embodiments are claimed in the independent claims.

BRIEF DESCRIPTIONS OF THE DRAWINGS

For a more complete description of the present invention and for further objects and advantages thereof, reference is made to the following description, taken in conjunction with the accompanying drawings, in which.

DETAILED DESCRIPTION OF THE PREFERRED EMBODIMENTS

Figure 1A:
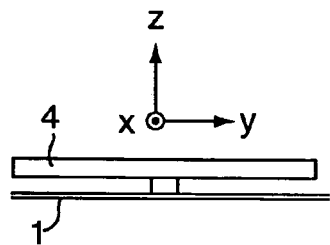
FIGS. 1A–1F are various suspension systems known in the art.
Figure 1B:
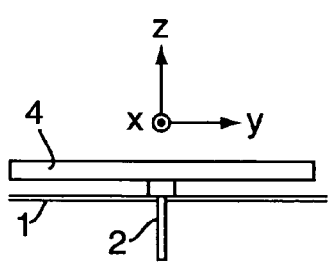
Figure 1C:
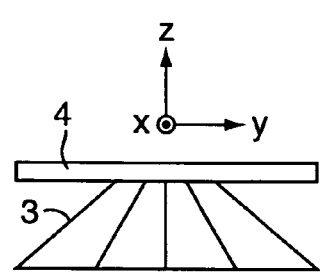
Figure 1D:
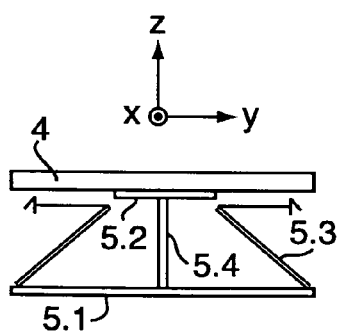
Figure 1E:
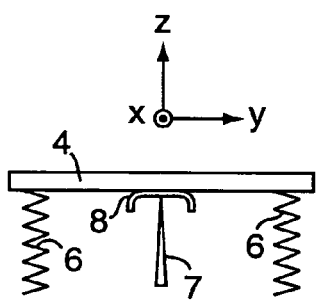
Figure 1F:
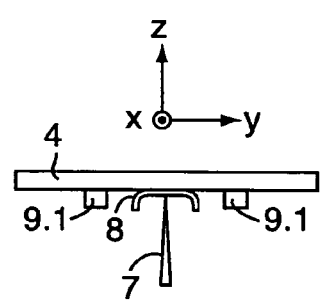

The basic function of a suspension system in accordance with the present invention is described in the following paragraphs before addressing specific embodiments of the invention.

Detailed investigations, evaluations and the comparison of known approaches revealed that the membrane-type suspension systems are most promising for the purposes of the present invention. In particular the low cost, the simplicity of the suspension design and assembly, the stiffness in $T_x$, $T_y$ and the strength in $T_x$, $T_y$ are important advantages over other approaches.

For most suspension systems and positioning applications it is desirable to design the suspension system such that it has a low stiffness at least in $R_x$ and $R_y$ (this results in a low power consumption if the suspension system is used in a positioning assembly) and a high stiffness in $T_x$, $T_y$, $T_z$, and $R_z$; where $T_z$ is the stiffness for transversal movements parallel to the z-axis, $R_x$ is the stiffness for rotational movements around the x-axis, and so forth. In other words, a preferable embodiment of the system allows tilting movements in the x-y plane. Any other movements are constrained.

In another suspension system and positioning application it is desirable to design the suspension system such that it has a low stiffness at least in $T_x$, $R_x$, and $R_y$ and a high stiffness in $T_x$, $T_y$, and $R_z$. In other words, this system allows movements parallel to the z-axis and tilting movements in the x-y plane. Any other movements are constrained.

According to the present invention, a flat spring member is employed. The spring member has an so-called active area, i.e., an area that is displaceable/moveable. The spring member is attached to a suspension frame. Note that the word frame is not supposed to indicated that the frame has to have a closed structure. An open frame or a section of a frame is suited as well. The spring member is at least at n=3 positions connected to the suspension frame. Herein a distinction is made between fixed connections and preload connections. A fixed connection is a connection that locally fixes the spring member with respect to the suspension frame. A preload connection is a connection where a preload element is employed. The preload element is arranged with respect to the spring member in a manner to locally apply a preload force to the spring member. The fixed connection(s) and the preload connection(s) are arrange with respect to the spring member so as to provide a positive stress in the spring member's active area. For this purpose the fixed connections and the preload connections are spaced apart. The active area is typically the area between the fixed and the preload connections.

One embodiment, depicted in FIGS. 2A through 2D, is based on the interplay of several flexible members, herein referred to as leg-shaped members or simply legs. These leg-shaped members form a flat spring member. The embodiment comprises three or more in plain oriented leg-shaped flexible members. At least one of these legs is soft-preloaded in the direction of orientation with a preload element that allows one degree of freedom in the direction of the preload. A suspension system that comprises three or more such leg-shaped members—which are preferably symmetrically oriented at an angle towards each other—can be made to offer the before-mentioned stiffness characteristics. The leg-shaped members form a cross-like spring member. This cross-like spring member either may be a membrane with cut outs or it may be an assembly with n (n≧3) individual legs.

Figure 2A:
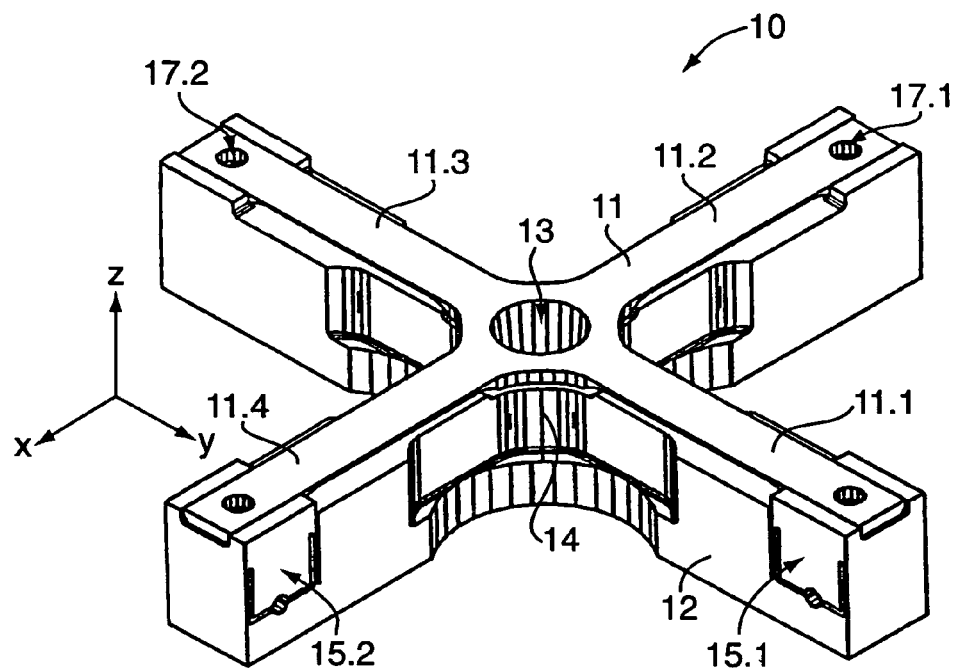
FIG. 2A is a perspective view of a first suspension system according to the present invention.

A first suspension system 10 (e.g., being part of a fine positioning assembly) is depicted in FIG. 2A. The assembly 10 comprises a cross-like spring member 11 and a mounting base 12 (also referred to as suspension frame). The spring cross 11 has in the present embodiment four (i.e., n=4) leg-shaped members 11.1, 11.2, 11.3, and 11.4 which together form the spring cross 11. In the center position of this spring cross 11, an opening 13 with circular cross section and cylindrical sidewall 14 is provided. The cylindrical sidewall 14 protrudes downwards and extends into a depression or through hole 16 of the suspension frame 12. The opening 13 with sidewall 14 is optional. The opening 13 can be used to attach an optical element (e.g., a mirror) to the spring cross 11. For this purpose the mirror may comprise a protruding element at its back side, said protruding element being designed so as to fit into the opening 13. Preferably, a collet chuck is used to clamp the mirror.

In the present embodiment, the legs 11.1 and 11.4 are soft-preloaded in the direction of their longitudinal orientation. The leg 11.1 is preloaded in a direction parallel to the y-axis and the leg 11.4 is preloaded in a direction parallel to the x-axis. The pre-loading is achieved by means of preload elements 15.1 and 15.2. The preload element 15.1 applies a force that pulls the leg 11.1 in the positive y-direction. The preload element 15.2 applies a force that pulls the leg 11.4 in the positive x-direction.

The legs 11.2 and 11.3 are either fixed at their respective ends portions to the suspension frame 12. The legs 11.2 and 11.3 can be fixed to the suspension frame 12 using screws, for example. The holes 17.1 and 17.2 for example can be used to insert the screws 21. The legs 11.2 and 11.3 can also be glued, welded or otherwise connected to the suspension frame 12. In the embodiment illustrated in FIG. 2A, the legs 11.2 and 11.3 may be fixed (e.g., using an adhesive) at their respective ends to the suspension frame 12.

Figure 2B:
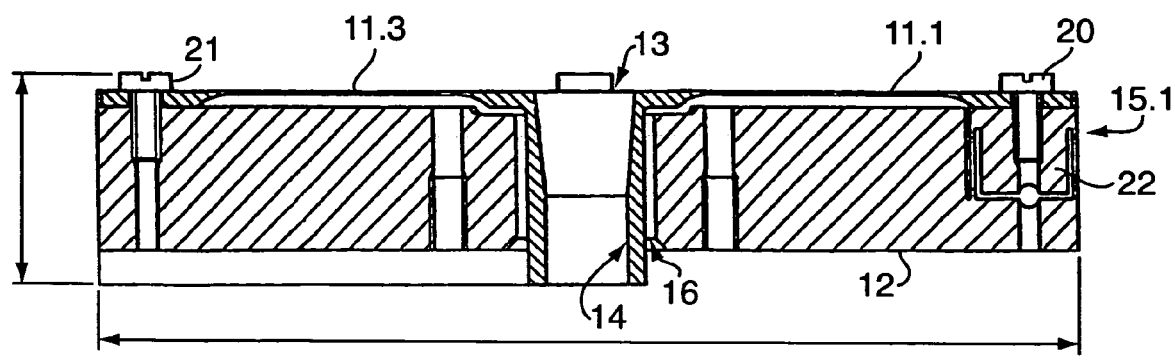
FIG. 2B is a cross section of the first suspension system according to the present invention.
Figure 2C:
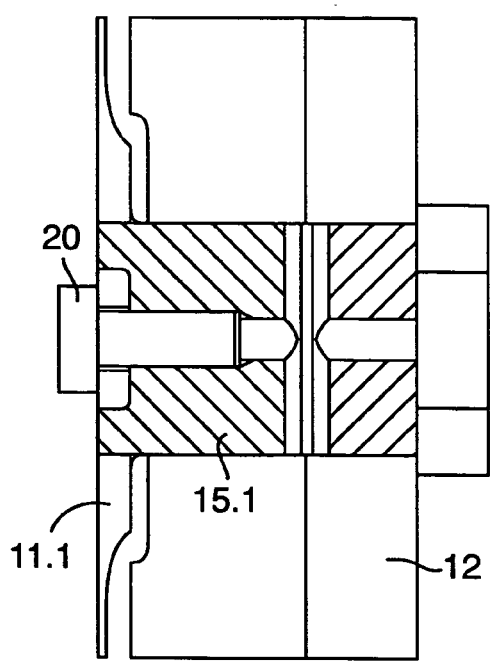
FIG. 2C is a cross section of a part of the first suspension system according to the present invention.
Figure 2D:
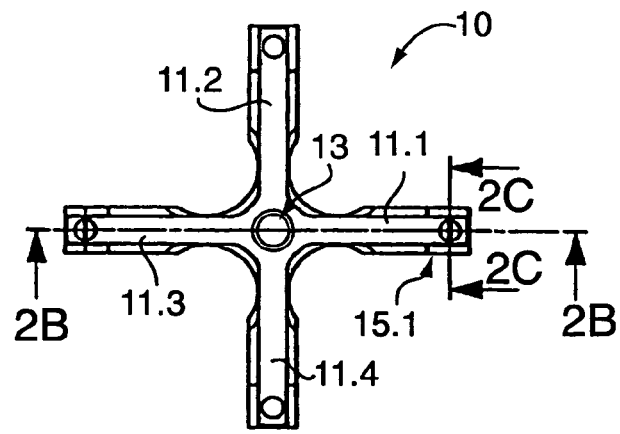
FIG. 2D is a top view of the first suspension system according to the present invention.

FIG. 2B is a cross section of the two legs 11.1, 11.3 and part of the suspension frame 12. Each leg has a very thin and flexible section. The end portions of the spring members 11.1 and 11.3 are thicker than the intermediate portions. In the present embodiment, the preload element 15.1 is realized by means of a block 22 being attached to a bottom part at the end portion of the leg 11.1. This block 22 is in the present embodiment an integral part of the suspension frame 12. The block 22 is partially separated from the suspension frame 12 by thin cuts. The cuts preferably extend parallel to the x-y plane and parallel to the z-x plane. These cuts form a flexible element that allows displacement in only one direction and is used to produce preload in this direction by displacing the flexible element. The leg 11.1, for instance is preloaded in the y-direction. Due to this, the stiffness in $T_y$ is high but a rotational movement around the x-axis is easily possible, i.e. $R_x$ is low. The leg 11.4 is preloaded in the same manner. The stiffness in $T_x$ is thus high and the stiffness $R_y$ is low.

Due to the preloading of a flat spring member, a stable suspension is provided that has one stable position. The suspended mass will thus return without external forces from any orientation to one defined orientation. According to the invention this is achieved over a certain temperature/gradient range due to the preloading. A hard pre-load turned out not to be satisfactory because the tip-tilt spring constant will change considerably with temperature. In other words, when designing the preload element, according to the present invention, one has to take into consideration that this preload element has to have a low stiffness. According to the present invention, a preload force between 1N and 50N is well suited, but under certain circumstances a lower or higher preload force can be necessary.

Figure 3:
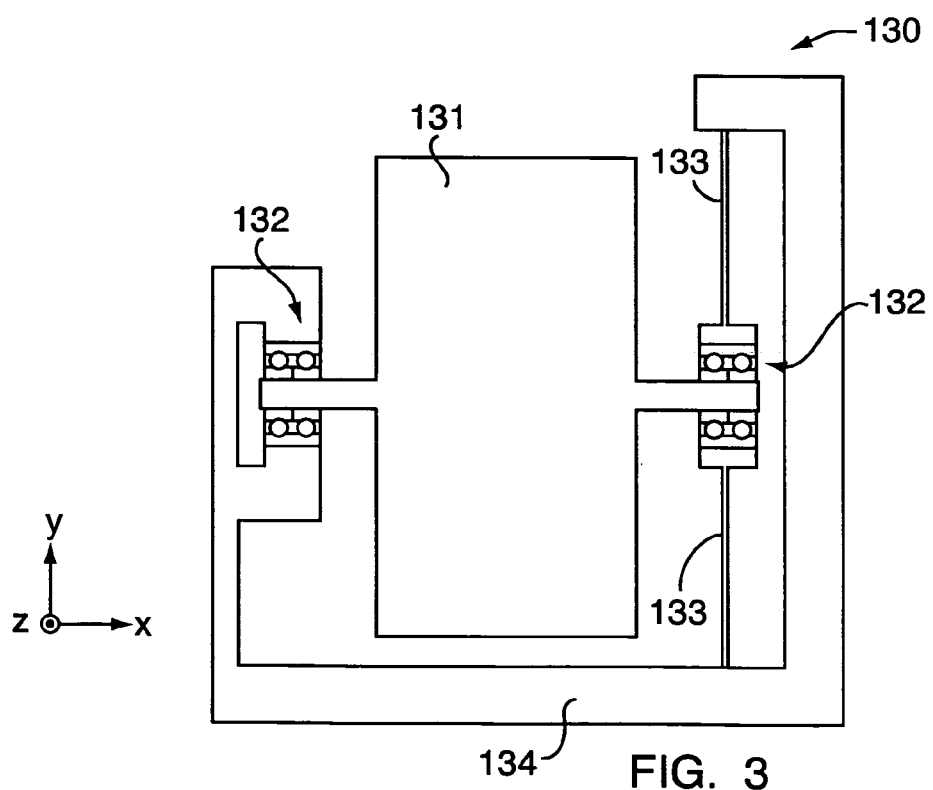
FIG. 3 is a schematic view of a mirror suspension according to the present invention.

A mirror suspension 130, according to the present invention, is depicted in FIG. 3. A mirror 131 is mounted in two ball bearings 132. These bearings 132 allow a rotation around the x-axis but no movements in the y and z-direction, especially not in $T_x$. The ball bearing 132 on the right hand side is suspended by a flat spring member 133, according to the present invention. The bearings 132 are mounted in a suspension frame 134. When a difference in expansion between the mirror 131 and the suspension frame 134 occurs, the difference is "absorbed" by the flexible spring member 133. No large force is thus transferred through the mirror 131 and deformations of the mirror 131 are prevented.

Figure 4:
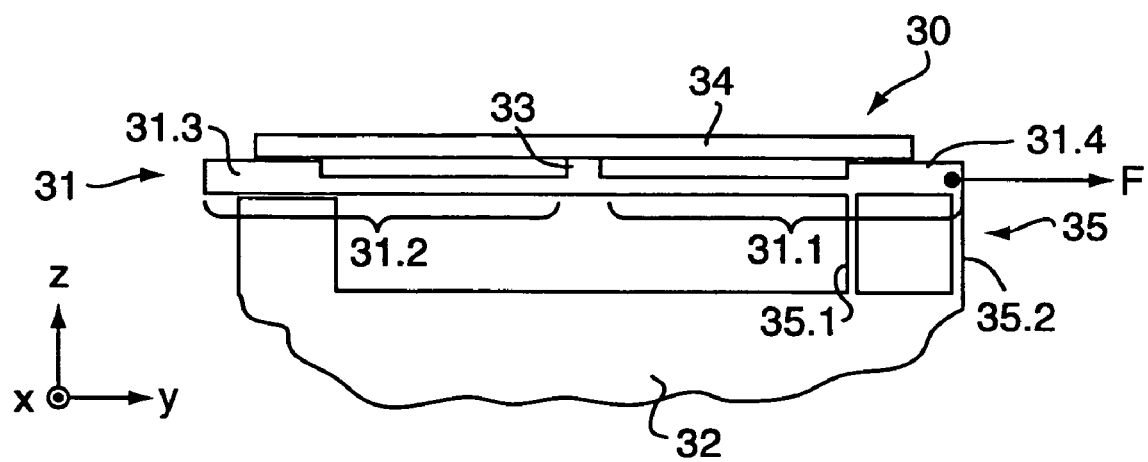
FIG. 4 is a schematic cross section of another suspension system according to the present invention.

A fast-steering mirror system 30 comprising a positioning assembly with suspension system in accordance with the invention is schematically depicted in FIG. 4. The system 30 comprises a flat cross-like spring member 31. A cross-section of two legs 31.1 and 31.2 is depicted in FIG. 4. The legs of the cross-like spring member 31 are at least partially flexible. A suspension frame 32 is situated underneath the cross-like spring member 31. The suspension frame 32 fixes the end portion 31.3 of the leg 31.2. A preload element 35 is arranged with respect to the end portion 31.4 of the leg 31.1 in a manner to apply a preloading force F at the second end 31.4, as illustrated by means of the arrow F. The cross-like spring member 31 comprises a protruding portion 33. A mirror 34 is mechanically connected to this protruding portion 33. The cross-like spring member 31 serves as a spring like member that allows the mirror 34 to be moved up and down (parallel to the z-axis) and to perform rotational movements around the x-axis and y-axis. The cross-like spring member 31 provides for the suspension of the mirror 34. That is, the system 30 has a low stiffness in $T_z$, $R_x$, and $R_y$. The stiffness in all other directions $T_x$, $T_y$, and $R_z$ is high.

A positioning assembly comprising a suspension system with cross-like spring member has the advantage that the actuators, sensors, etc. can be placed in between the legs forming the cross.

The preload element 35 of FIG. 4 comprises two thin spring elements 35.1 and 35.2. These spring elements 35.1, 35.2 are at their lower end attached to the suspension frame 32. At their upper ends the spring elements 35.1, 35.2 are connected to the end portion 31.4 of the leg 31.1.

In FIG. 4 only the passive elements of the fast-steering mirror system 30 are depicted. The fast-steering mirror system 30 may further comprise actuators that allow the mirror 34 to be displaced in a controlled manner. Preferably, three or four actuators are employed. Drive electronics may be provided to drive the actuators. The drive electronics may be designed to accept power and angular position commands, for example. Well suited are voice-coil actuators, piezo actuators, stepper motors and the like. Furthermore, a detection unit (e.g., comprising inductive feedback sensors) is provided that detects the actual position of the mirror 34. This detection unit may generate signals that are processed by a (micro)computer. The computer then controls the actuators to dynamically adjust the position of the mirror 34.

The mirror 34 may be a beryllium mirror for example. Its diameter may be between 10 mm and 50 mm, for the embodiment presented in FIG. 4. The concept presented herein can be expanded to larger mirrors.

Figure 5A:
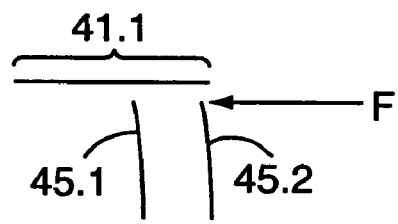
FIGS. 5A–5B is a sequence of two steps according to the present invention.
Figure 5B:
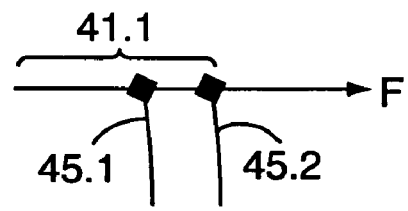

There are different ways to produce and/or assemble the suspension frame and spring member so that a preloading force F is applied. One example is illustrated in FIGS. 5A and 5B.

In these Figures, a simplified sketch of a suspension system is depicted. It comprises a flat spring member. Only a portion of the spring member 41.1 is depicted in FIGS. 5A and 5B. There are two thin spring elements 45.1 and 45.2. These spring elements 45.1, 45.2 rest on a suspension frame (not visible in FIGS. 5A and 5B). In a first step, depicted in FIG. 5A, the spring elements 45.1, 45.2 are pushed to one side by applying a force F. The end portion of the spring member 41.1 is now welded onto the spring elements 45.1, 45.2, as schematically indicated in FIG. 5B by means of black rhombs. During the welding step the spring elements 45.1, 45.2 are still pushed to the left until the welding step is completed. After the welding, the whole arrangement tries to return into its home position since the spring elements 45.1, 45.2 pull the end portion 41.1 to the right hand side. Due to this, a force F is applied, as indicated in FIG. 5B, and the spring member 41.1 is preloaded in the direction of its orientation.

Figure 6A:
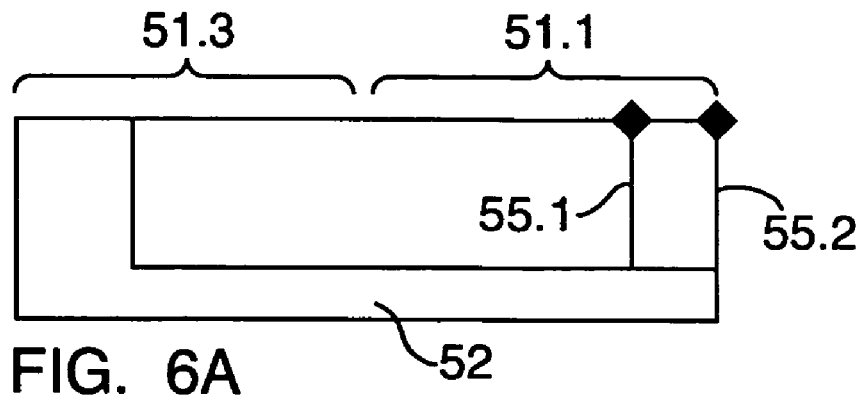
FIGS. 6A–6C is a sequence of steps according to the present invention.
Figure 6B:
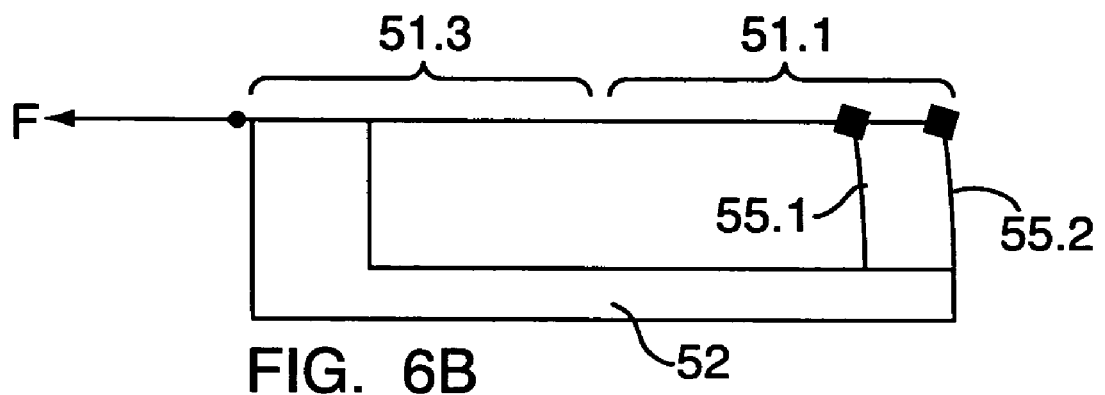
Figure 6C:
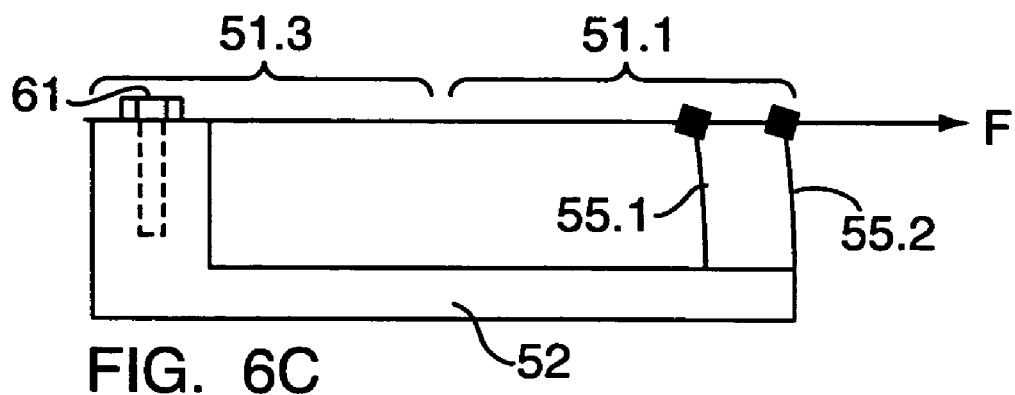

In another embodiment, schematically illustrated in FIGS. 6A through 6C, the flat spring member is preloaded during assembly by fixing its end portion 51.1 to spring elements 55.1, 55.2 (e.g., like the spring elements of FIGS. 5A and 5B), while these spring elements are relaxed 55.1, 55.2. This step is illustrated in FIG. 6A. In a subsequent step depicted in FIG. 6B, the whole spring member can be pulled in the direction towards its opposite end portion 51.3. When pulling the whole spring member, the spring elements 55.1, 55.2 will bend to the left. Now the opposite end portion 51.3 of the spring member is fixed to the suspension frame 52. This can be done by means of a screw 61, bolts, glue (e.g., epoxy) or by other fastening means, as shown in FIG. 6C. The spring elements 55.1, 55.2 try to return to their relaxed position and by doing so a force F pulls to the right hand side. This provides for a positive stress inside the flat spring member 51.1, 51.3.

Figure 7:
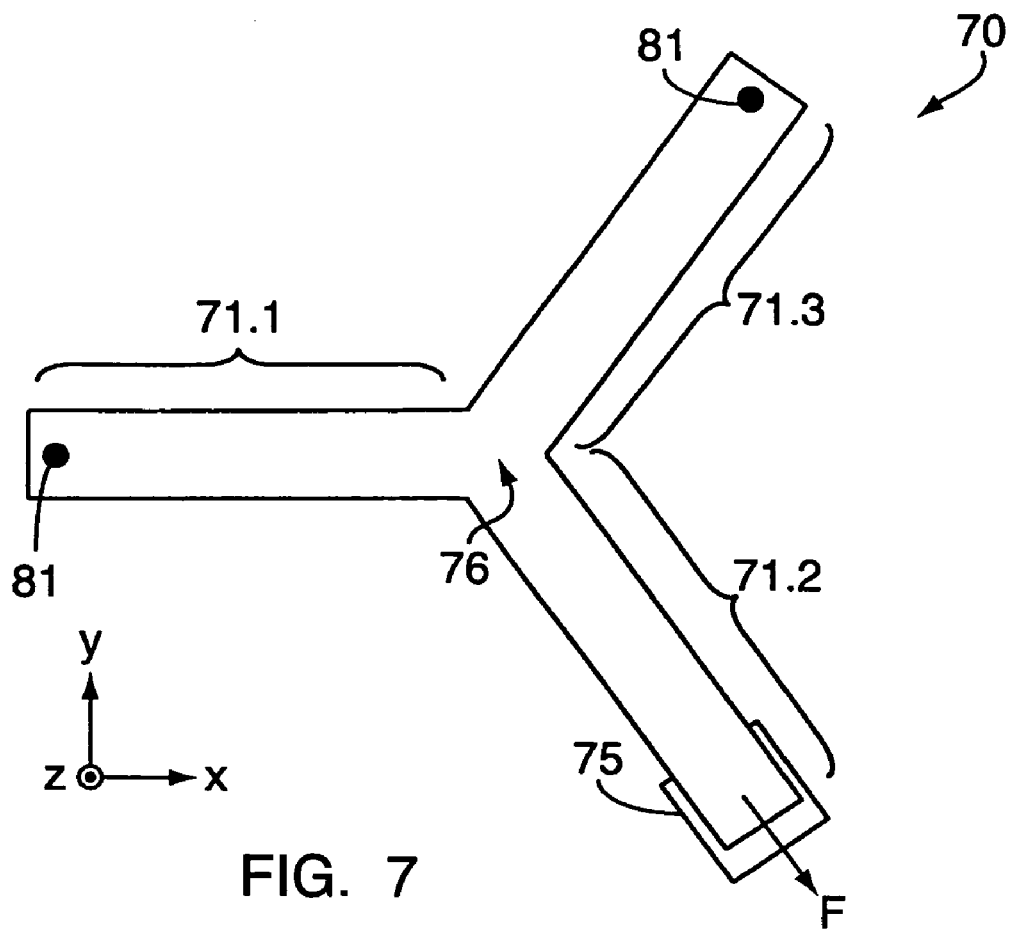
FIG. 7 is a schematic top view of another suspension system according to the present invention.

Another cross-like spring member 70 having n legs, with n=3, is depicted in FIG. 7. The three legs 71.1 through 71.3 are symmetrically arranged within the x-y-plane around the center position 76 of the flat spring member 70. Each of the legs 71.1 through 71.3 has a longitudinal axis and an end portion. A suspension frame is provided to support the spring member 70 by fixing the end portion of m=2 legs, with m<n. The suspension frame is not illustrated in FIG. 7. One preload element 75, with k=1=n−m, is arranged close to the end portion of the leg 71.2 that is not fixed to the suspension frame. A preloading force F is applied to the leg 71.2, the preloading force F essentially pointing in the direction of the longitudinal axis. This arrangement ensure a positive stress in the active area of the flat spring member 70. The active area in the present embodiment is the area between the positions 81 and the position where the preload force F applies.

Figure 8:
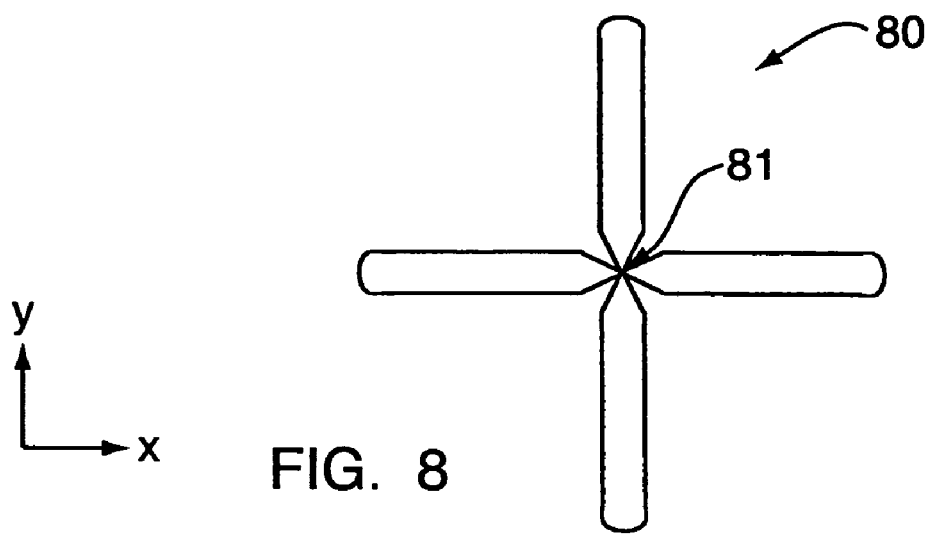
FIG. 8 is a schematic top view of yet another suspension system according to the present invention.

Yet another cross-like spring member 80 having n legs, with n=4, is depicted in FIG. 8. The four legs are symmetrically arranged within the x-y-plane around a center position 81 of the flat spring member 80. Each of the legs has a longitudinal axis and an end portion.

Figure 9:
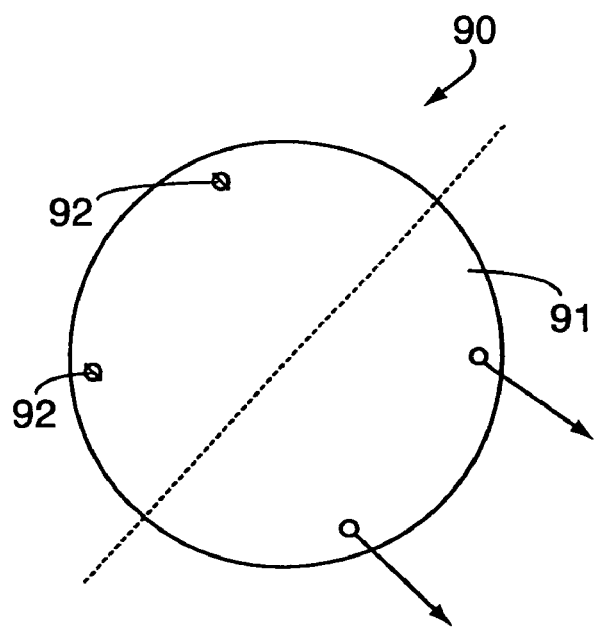
FIG. 9 is a schematic top view of yet another flat spring member according to the present invention.

Another embodiment is illustrated in FIG. 9. A suspension system 90 with a flat spring member 91 is depicted. The flat spring member has the shape of a disc. The spring member 91 is connected at four positions to a suspension frame (not illustrated in this Figure). m=2 positions 92 are fixed with respect to the suspension frame and there are k=2 preload elements (not illustrated in this Figure), applying preload forces F onto the spring member 91. Due to the preload forces F, a positive stress is provided in the active area of the spring member 91.

Figure 10:
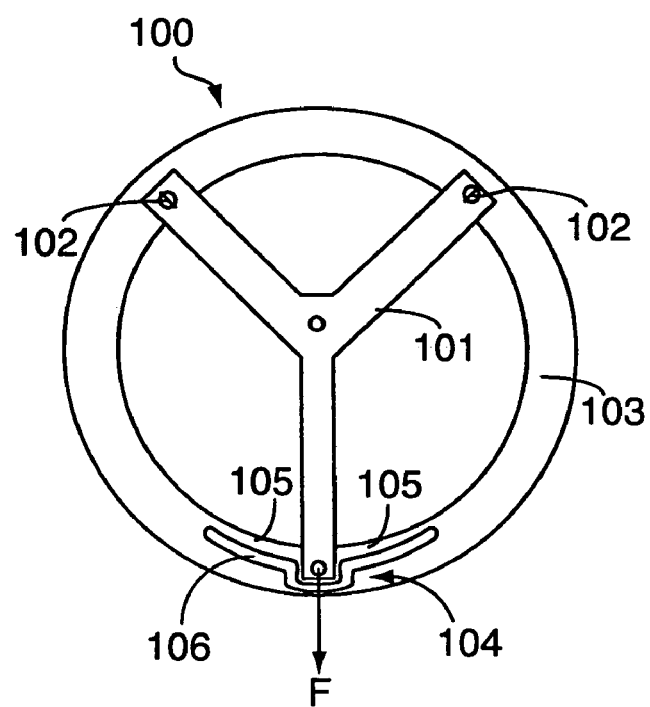
FIG. 10 is a schematic top view of yet another suspension system according to the present invention.

A further embodiment is shown in FIG. 10. A suspension system 100 with a flat spring member 101 is depicted. The flat spring member 101 is a cross-like spring member having 3 legs. The flat spring member 101 is connected at three positions to a ring-shaped suspension frame 103. m=2 positions 102 are fixed with respect to the suspension frame 103 and there is k=1 preload element 104, applying a preload force F onto the spring member 101. The preload element 104 comprises a spring element 105 being an integral part of the suspension frame 103. The spring element 105 is realized by removing part of the suspension frame 103 to provide a slit 106.

Figure 11:
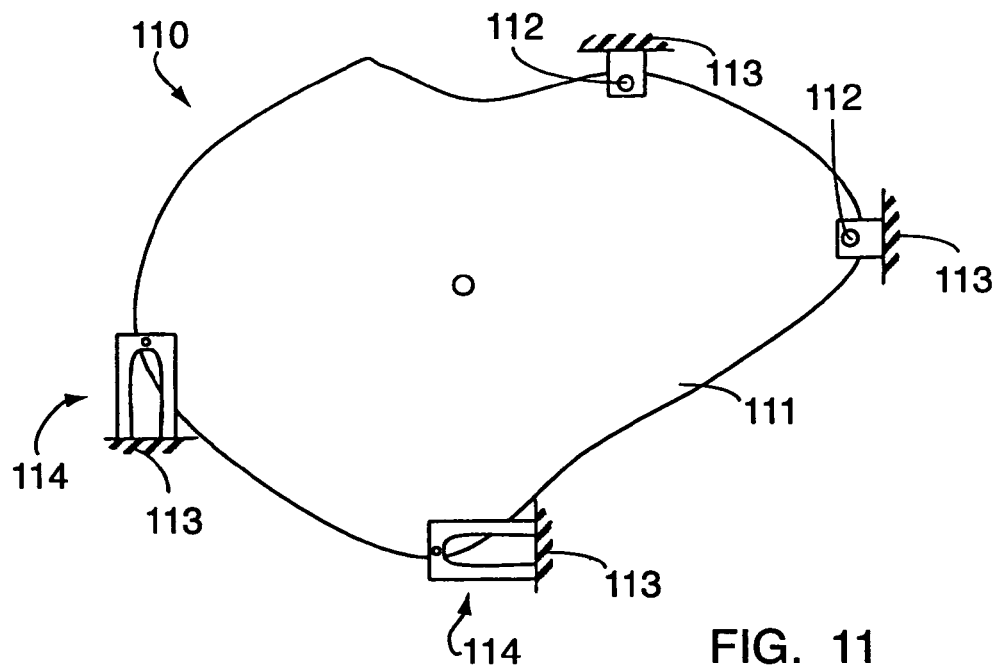
FIG. 11 is a schematic top view of yet another suspension system according to the present invention.

Another suspension system 110 is given in FIG. 11. The suspension system 110 comprises a flat spring member 111 of irregular shape. The flat spring member 111 is connected at four positions to a suspension frame 113 (only a small part of the suspension frame 113 is shown in FIG. 11). m=2 positions 112 are fixed with respect to the suspension frame 113 and there are k=2 preload element 114, applying preload forces F onto the spring member 111. The preload elements 114 each comprise a U-shaped element having two legs with low spring constant.

Figure 12:
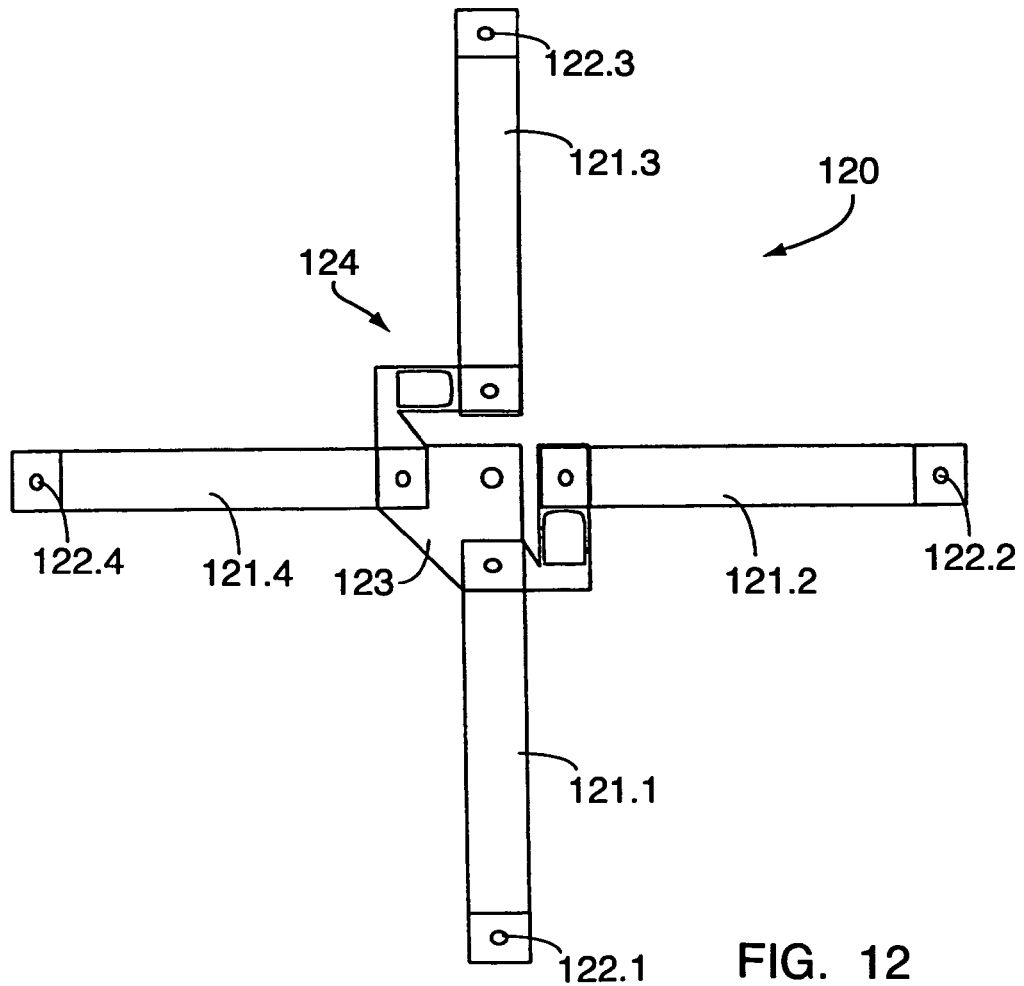
FIG. 12 is a schematic top view of yet another suspension system according to the present invention.

Yet another suspension system 120 is given in FIG. 12. The flat spring member is a cross-like spring member having 4 legs 121.1 through 121.4. The spring member is fixed at four positions 122.1 through 122.4 to a suspension frame (not illustrated in this Figure). In the center, the spring member comprises a plate 123. This plate connects the four legs 121.1 through 121.4. Two preload elements 124 are integrated into the plate 123. The preload elements 124 are U-shaped and have two legs with low spring constant.

In another embodiment (not illustrated), the flat spring member is disc-shaped or nearly disc-shaped. Like in FIG. 12, the flat spring member may be fixed with respect to the suspension frame at the circumference. The preload elements are arranged close to the center of the spring member.

There are other ways to provide for the preloading of a flat spring member. One other way would be to fix end portions of the spring member to respective pedestals of a suspension frame. In a subsequent step, the suspension frame is modified in order to provide for a small relative movement between at least two of the pedestals. Due to this relative movement and due to the preload force, positive stress is imposed onto the active area of the flat spring member.

Instead of modifying the suspension frame, one can provide for a non-reversible deformation or deflection of the spring elements so that after this step a force F is applied to the portion of the flat spring member. Layered spring elements can be employed, for instance, whereby the bi-metal effect leads to the necessary deflection. It is also conceivable to provide for a deformation of the suspension frame, for instance by a heat treatment.

The flat spring member comprises a material with spring characteristics, high yield, fatigue strength, and low E-modulus. Depending on the field of application, the suspension frame and/or the flat spring member may comprise plastic, or silicon, or metal (e.g., stainless steel or aluminum) alloys (e.g., beryllium copper alloy).

Very small suspension systems (down to sub-micron size), positioning assemblies, and fine positioning assemblies can be made according to the present invention. The span from one end of the flat spring member to the opposite end may be in the range between 20 mm and 1 m. The total thickness of the suspension system (suspension frame plus flat spring member) may be between 5 mm and 20 cm. In case of a cross-like spring member, each leg may have the following dimensions: length between 5 mm and 50 cm; thickness between 0.1 mm and 1 cm; width between 1.5 mm and 10 cm.

The present invention can be applied to any membrane device comprising a flat spring member affording the benefits described herein.

According to the present invention, a flat spring member serves as a kind of membrane which is preloaded parallel to at least one in plane axis. Pre-loading elements are employed providing for one degree of freedom.

According to the present invention, the stiffness in the $T_x$ and $T_y$ plane is maintained up to approximately the level of the preload in the preload elements. The transfer of high loads in $T_x$, $T_y$ can be accommodated by limiting the deflection range of the preload elements by means of (mechanical) stops. This will make the assembly more robust against overload in $T_x$, $T_y$ directions. The stops can be an integral part of the suspension frame or the stops can be attached to the suspension frame.

A suspension system according to the invention offers inherent advantages such as frictionless, stictionless and clean operation. According to the invention, the suspension component friction is limited to internal material properties which allows high accuracy also at high frequency movements of the assembly.

The invention has several advantages if compared with conventional positioning approaches:

the inertia of the suspension system can be made uniform in all tip tilt directions, i.e., in $R_x$, $R_y$ directions);

the suspension system can be made to be impervious to environmental strain (e.g., known changes in environmental conditions, i.e., thermal strain or mechanical loads during the launch of a rocket carrying a satellite);

the suspension system can be made to retain its position and stiffness characteristics over a wide working range;

the stiffness coefficients $T_z$, $R_x$, and $R_y$ are more or less constant, i.e., they do not change over the working range.

The present invention is also well suited for non-terrestrial applications. A suspension system in accordance with the present invention could be part of a satellite terminal where the suspension system carries a mirror, a laser, a precision pointing device, an antenna, or a lens of the terminal.

With the present invention it is possible to design a suspension system having a low stiffness in $R_x$ and $R_y$. A stiffness below 1.2 Nm/rad can be achieved. A preferable embodiment has a stiffness between 0.1 Nm/rad and 0.7 Nm/rad, just to give some examples.

The suspension system can be realized so that it has a range in $R_x$ and $R_y$ direction of ±20 mrad. Preferably, the suspension system has a range in $R_x$ and $R_y$ direction of ±10 mrad. The range can be restricted by stops if required, as addressed further above.

It is an advantage of the invention that a positioning system can be realized that accurately centers the suspended element (e.g., the mirror) in the $R_x$ and $R_y$ direction or returns it to a known position when the system is not actuated.

A positioning assembly may be provided that has in addition to the passive restriction in all directions where the suspension is expected to have high stiffness, e.g., the $T_x$, $T_y$, and $R_z$ direction, means for active control in the $R_x$, $R_y$, and $T_z$ direction. The actuators providing for correcting movements of the mirror, for example, can be used as active damping. Preferably, the range in the $R_x$, $R_y$ and $T_z$ direction is limited. The range may be limited by stops that work on the suspended element.

According to the present invention, suspension systems can be realized that are able to withstand loads of more than 200 N (e.g., during the launch of a rocket).

Another embodiment is characterized in that one or more stops are provided that limit movements in one or more of the following directions $T_z$, $R_x$, and $R_y$. This is important in cases where the suspension system or positioning assembly is exposed to forces that may lead to an overload. The forces during the launch of a rocket carrying a satellite payload with a suspension system or positioning assembly may lead to an overload for example. The transfer of high loads can be accommodated by stops that limit the travel in one or more of the following directions $T_z$, $R_x$, and $R_y$.

The invention is suited for civil and military applications. A typical military application where the inventive assembly can be used is a tracking system for tracking targets or projectiles.

It is also conceivable to use the inventive assembly for establishing and maintaining an optical communication link between a terrestrial terminal and a satellite terminal. The inventive assembly allows to ensure a high line-of-sight stability.

A dynamic positioning assembly according to the present invention allows to maintain a precise alignment between source and target even in demanding environments (e.g., in space). Vibrations, thermal-induced motions, and mechanical creep can be compensated by an appropriate control system that actively corrects the position of the positioning assembly.

It is an advantage of the suspension systems and positioning assemblies presented herein that the inertia of this interface can be made uniform in all desired tip tilt directions.

A suspension system according to the present invention can be used in many different areas.

A positioning assembly according to the present invention can be used in semiconductor manufacturing and inspection, industrial marking, materials processing, biomedical systems, reprographics, information displays and telecommunications, scanning systems, astronomical telescopes, just to mention a few examples.

Misalignments once being detected can be quickly corrected and an optimal alignment of the optical axis of an optical system can be guaranteed.

What is claimed is:

1. Suspension system comprising
   a flat spring member, and
   a suspension supporting the spring member by fixing the spring member,
   characterized in that
   a suspension frame serves as the suspension that supports the spring member by fixing the spring member at m positions with respect to the suspension frame, with $m \geq 1$,
   said flat spring member serves as a membrane for carrying an optical element,
   k preload elements, with $k \geq 1$, being arranged with respect to the suspension frame and the spring member in order to locally apply a preload force to the spring member so as to provide for positive stress in an active area of the spring member,
   wherein $m+k \geq 3$,
   wherein the k preload elements comprise one or more spring elements being attached to or being an integral part of the suspension frame, and
   wherein said flat spring member comprises three or more in plane oriented leg-shaped flexible members.

2. The suspension system of claim 1, wherein the spring member is a cross-like spring member having $n=3$ or $n=4$ legs and wherein the suspension frame comprises $k=1$ or $k=2$ preload elements.

3. The suspension system of claim 2, wherein the cross-like spring member is a membrane with cut outs.

4. The suspension system of claim 1, wherein the suspension frame and/or the spring member comprises plastic, silicon or metal.

5. Positioning or alignment assembly having a suspension system, the suspension system comprising
   a flat spring member, and
   a suspension supporting the spring member by fixing the spring member,
   characterized in that
   a suspension frame serves as the suspension that supports the spring member by fixing the spring member at m positions with respect to the suspension frame, with $m \geq 2$,
   said flat spring member serves as a membrane for carrying an optical element,
   k preload elements, with $k \geq 2$, being arranged with respect to the suspension frame and the spring member in order to locally apply a preload force to the spring member so as to provide for positive stress in an active area of the spring member,
   wherein $m+k \geq 3$,
   wherein the k preload elements comprise one or more spring elements being attached to or being an integral part of the suspension frame, and
   wherein said flat spring member comprises three or more in plane oriented leg-shaped flexible members.

* * * * *

UNITED STATES PATENT AND TRADEMARK OFFICE
CERTIFICATE OF CORRECTION

| | |
|---|---|
| PATENT NO. | : 7,188,831 B2 |
| APPLICATION NO. | : 10/712717 |
| DATED | : March 13, 2007 |
| INVENTOR(S) | : Willem Walter Coppoolse |

Page 1 of 1

It is certified that error appears in the above-identified patent and that said Letters Patent is hereby corrected as shown below:

Column 12, Claim 5, line 23, please replace the number "2" with the number --1--.

Column 12, Claim 5, line 26, please replace the number "2" with the number --1--.

Signed and Sealed this

Third Day of July, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,188,831 B2 | Page 1 of 1 |
| APPLICATION NO. | : 10/712717 | |
| DATED | : March 13, 2007 | |
| INVENTOR(S) | : Willem Walter Coppoolse | |

It is certified that error appears in the above-identified patent and that said Letters Patent is hereby corrected as shown below:

Column 12, Claim 5, line 23, please replace the number "2" with the number --1--.

Column 12, Claim 5, line 26, please replace the number "2" with the number --1--.

Signed and Sealed this

Twenty-fourth Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 7,188,831 B2  Page 1 of 1
APPLICATION NO. : 10/712717
DATED : March 13, 2007
INVENTOR(S) : Willem Walter Coppoolse It is certified that error appears in the above-identified patent and that said Letters Patent is hereby corrected as shown below:

Cover Page, Inventor Information, please delete the word "Zurich" and replace it with the word --Embrach--.

Signed and Sealed this

Nineteenth Day of August, 2008

JON W. DUDAS
*Director of the United States Patent and Trademark Office*